May 8, 1956      I. JEPSON      2,744,995
ELECTRIC FRYING PAN
Filed Dec. 2, 1953      5 Sheets-Sheet 1
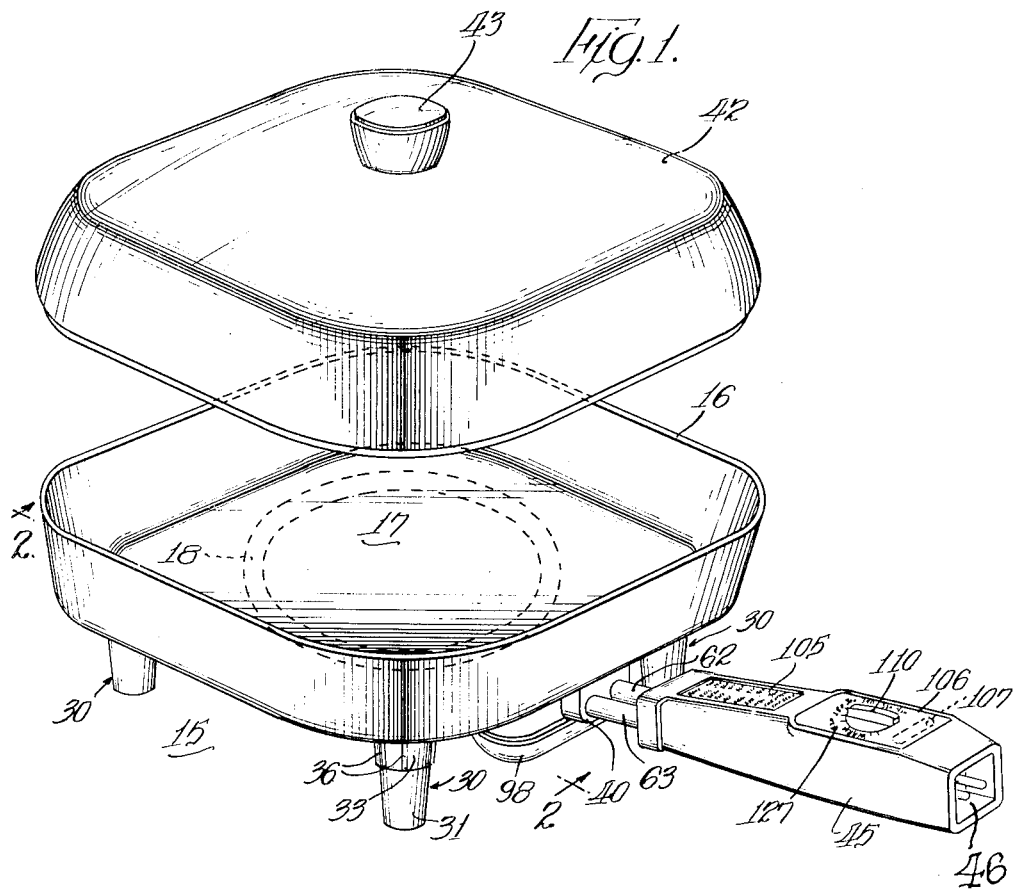
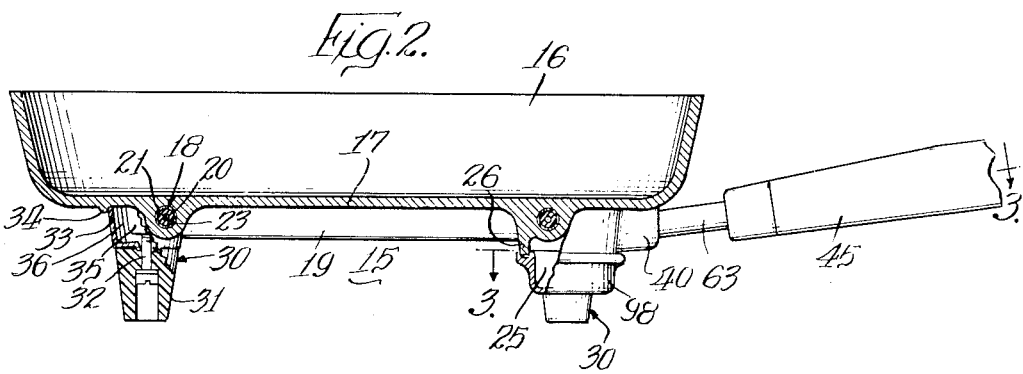
INVENTOR.
Ivar Jepson
BY
McCanna & Morsback
Attys.

May 8, 1956     I. JEPSON     2,744,995
ELECTRIC FRYING PAN
Filed Dec. 2, 1953     5 Sheets-Sheet 2
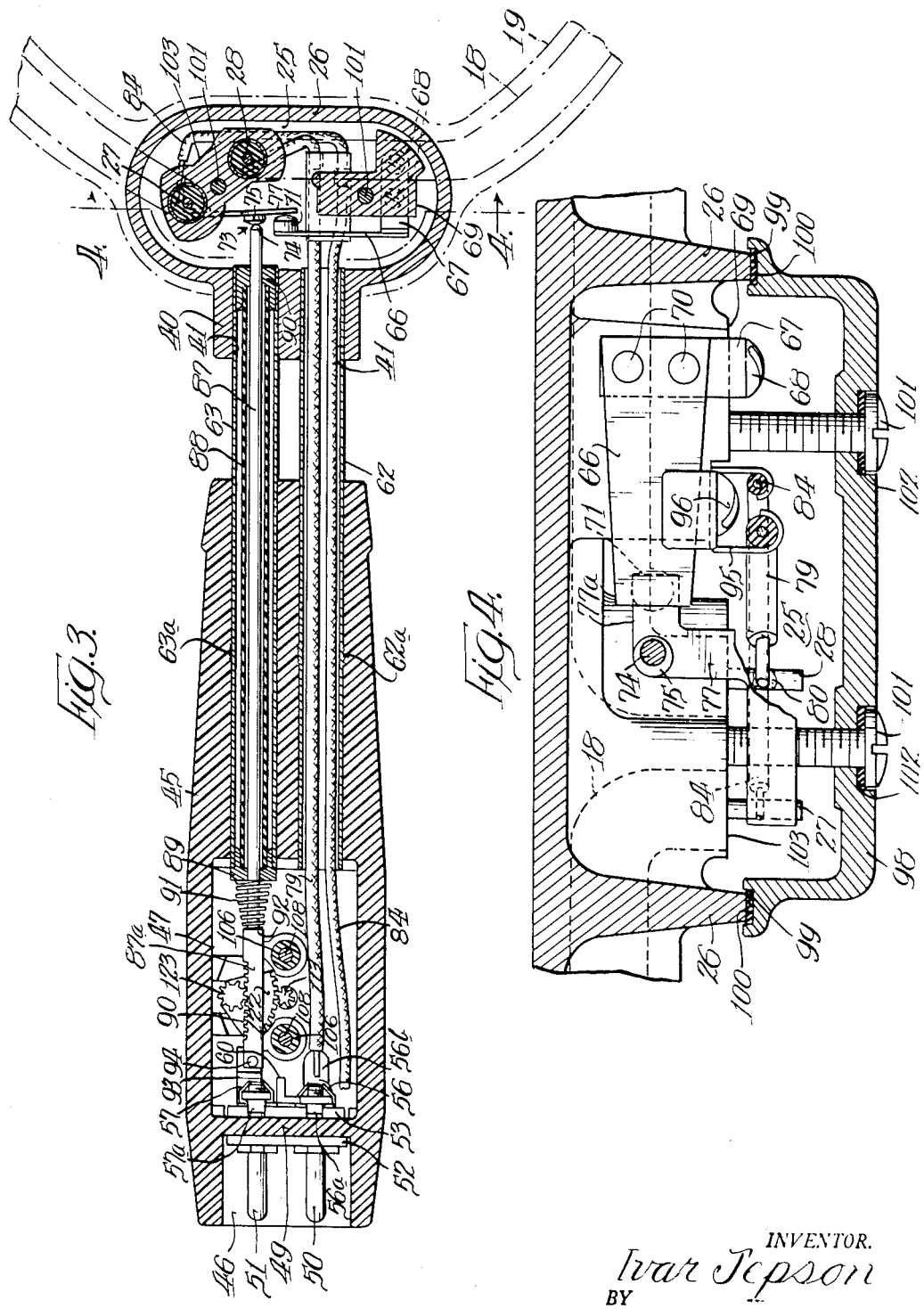
INVENTOR.
Ivar Jepson
BY
McCanna & Morsback
Attys.

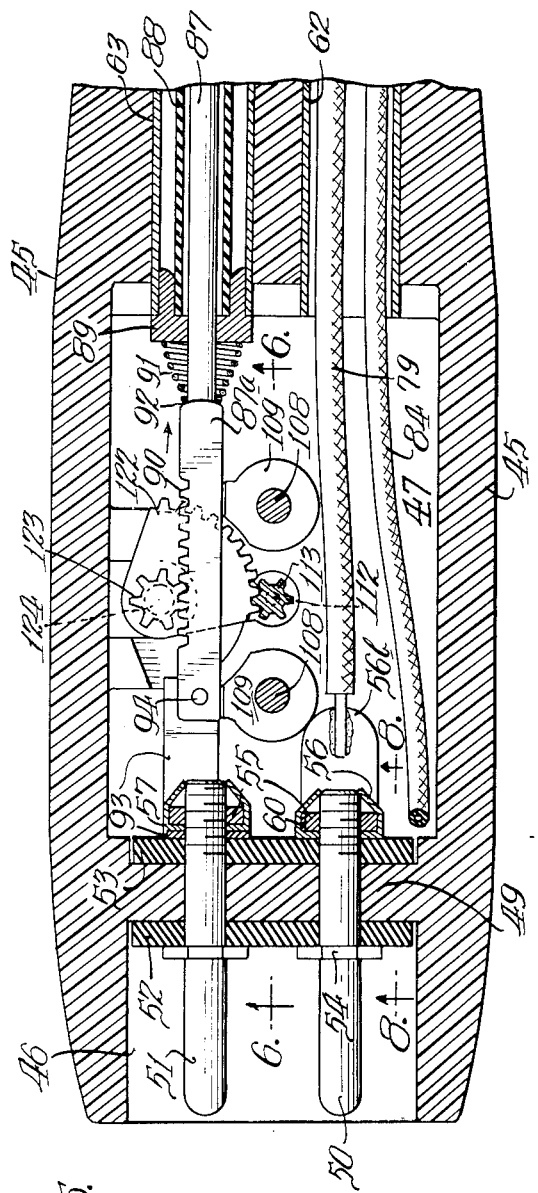

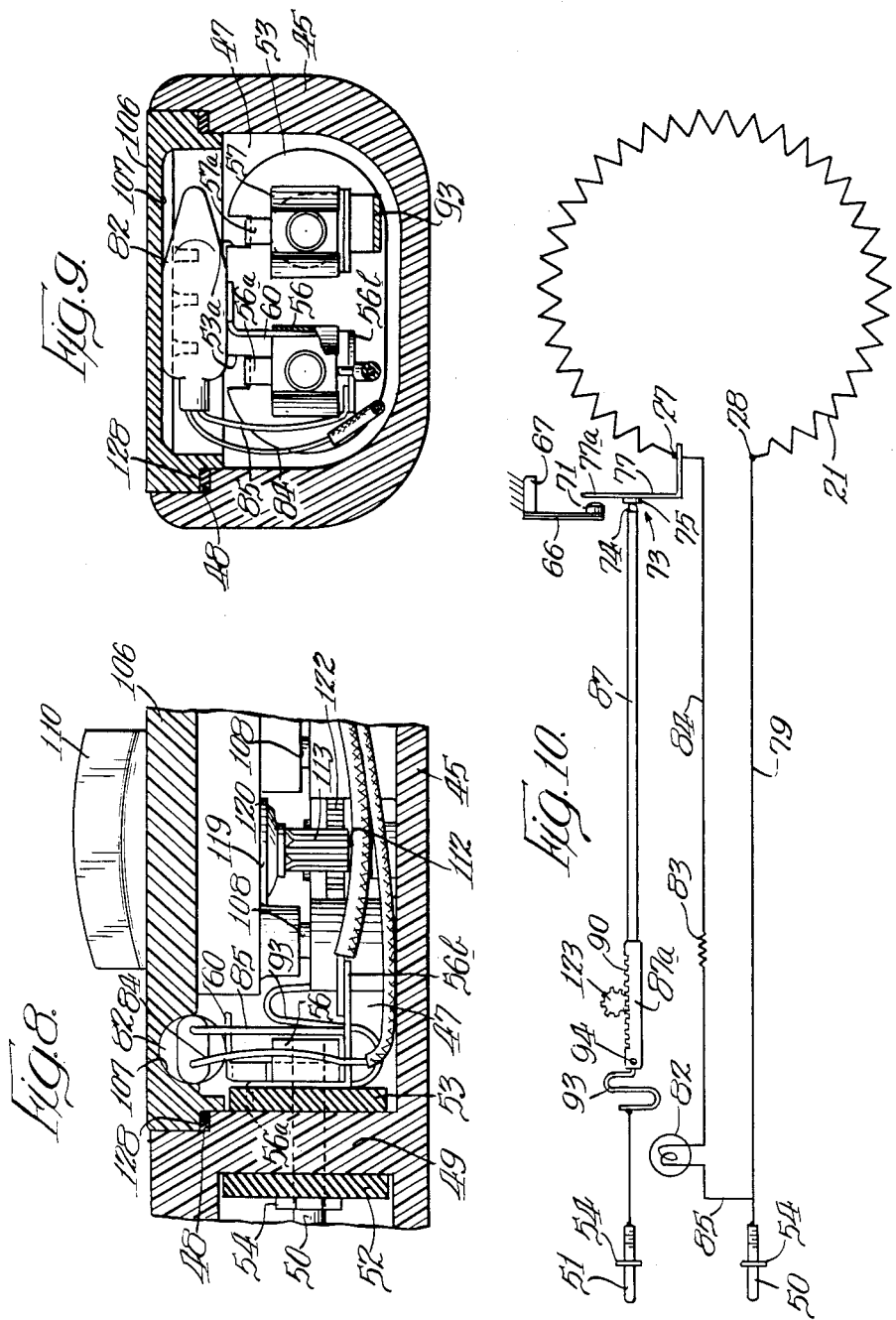

May 8, 1956  I. JEPSON  2,744,995
ELECTRIC FRYING PAN
Filed Dec. 2, 1953  5 Sheets-Sheet 5
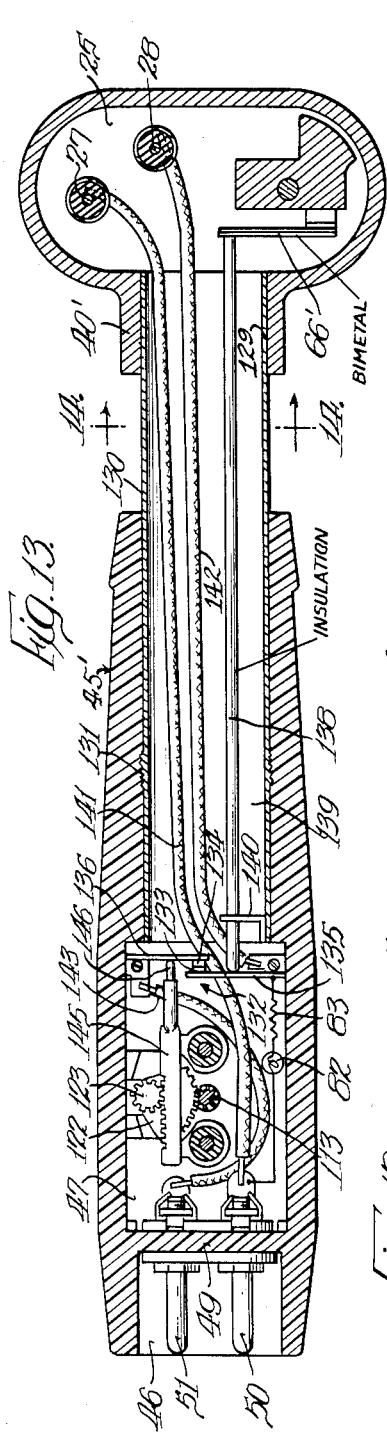
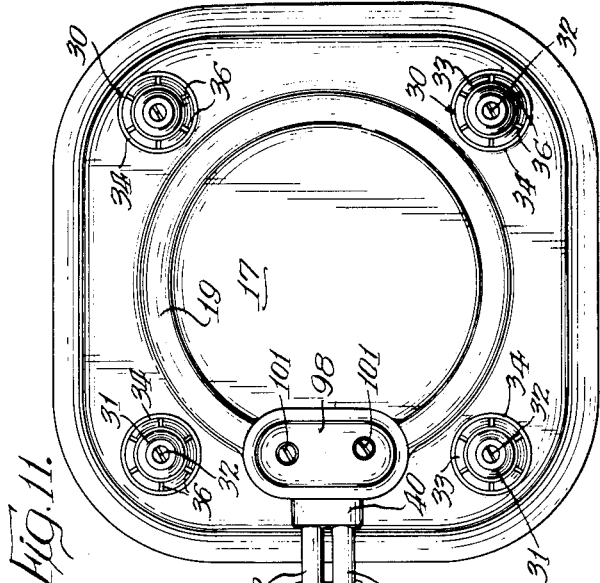
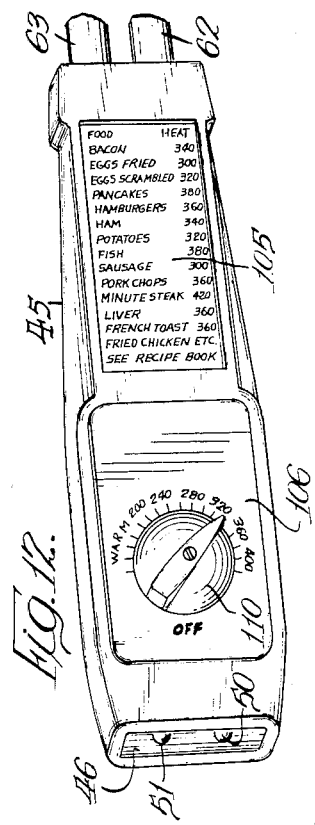
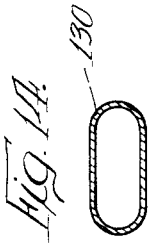
INVENTOR.
Ivar Jepson
BY
McCanna & Morsbach
Attys.

United States Patent Office 2,744,995
Patented May 8, 1956

2,744,995
ELECTRIC FRYING PAN

Ivar Jepson, Oak Park, Ill., assignor to Sunbeam Corporation, Chicago, Ill., a corporation of Illinois Application December 2, 1953, Serial No. 395,824

28 Claims. (Cl. 219—44)

The present invention relates to an electric frying pan having automatically controlled heating means, and more generally to an electric cooking vessel with built-in heating means and automatic temperature control means therefor.

The frying pan is an item that is a necessity to every housewife and few, if any, kitchens in this country are without a frying pan. The common method of using a frying pan is to supply it with heat from either a gas or electric plate, which gas or electric plate is usually associated with the well-known kitchen range. Such kitchen ranges quite often incorporate an oven which has automatic heat control. Thus, the housewife with such a range is able to get perfect baking and cooking temperatures in the oven but when cooking on the top of the stove never knows whether the heat is too high or too low, with the possibility of cooking failure. Obviously, the temperature of an open gas flame or the heat produced from an electric plate forming part of a kitchen range varies widely depending upon the nature of the gas as well as the gas pressure, or upon the voltage of the system, as the case may be, together with the various settings of the controls for controlling either the gas or electric source. Another variable that is difficult to control when cooking or frying with an ordinary kitchen range is the position of the frying pan or cooking vessel with respect to the heating zone. Obviously, if the vessel is very close to the flame or electric resistance heater a different type of heating would result than where a substantial space exists between the source of heat and the cooking vessel. Another variable resides in the vessel itself, which may be made from different materials, different thicknesses, and different sizes. As a result, when cooking or frying with an electric or gas range, it is difficult, if not impossible, to eliminate localized heating zones in a cooking vessel which might cause burning of the food in one case or insufficient cooking in another. Moreover, it is common practice in modern kitchens to have some sort of kitchen fan which produces certain air currents. Even without a kitchen fan, open doors or windows may cause drafts or air currents of various sorts which introduce variables as far as heating is concerned. It has been recognized that to have accurate control and efficient operation the heating element should be incorporated as a unit with the cooking vessel, being at least in intimate heat exchange relationship with the portion of the vessel defining the cooking surface.

The present invention contemplates the provision of a new and improved electric frying pan which completely eliminates the difficulties and variables set forth above which are inherent in cooking or frying with a vessel disposed above the ordinary gas or electric heat source as is commonly employed in a kitchen range. Furthermore, it contemplates an electric cooking vessel or frying pan with complete and fully automatic control so that any selected temperature setting may be maintained at the cooking surface, which temperature setting will insure uniform heating to the selected temperature over the entire cooking surface. To provide the desired arrangement mentioned above requires a self-contained frying pan or cooking vessel with the heating unit and control means incorporated therein.

A cooking vessel, such as a frying pan, presents a cleaning problem, since food particles and grease tend to stick to the cooking surface. The present invention also contemplates a self-contained frying pan or cooking vessel constructed so that it can readily be cleaned in the manner of ordinary cooking vessels or frying pans, namely, by immersing the same in water. Heretofore, electric frying pans or electric cooking vessels have not been designed so that the entire cooking vessel could be immersed in water for washing purposes.

In general, frying pans and cooking vessels have had a circular configuration to conform with the configuration of electric plates or gas burners on kitchen ranges, etc. This configuration has resulted in some wasted cooking surface when frying various articles of food. Moreover, the present invention contemplates the provision of an improved frying pan having a generally rectangular or square configuration to permit more efficient use of the same without adding to the cleaning problem by virtue of square corners or the like. With such an arrangement more foods can be cooked in the same area. At the same time, small quantities cook well.

The present invention further contemplates the incorporation in such an electric frying pan of improved means for controlling the heat for perfect cooking without requiring any attention, and at least eliminating the constant watching that has heretofore been inherent in frying foods, as well as the provision of an arrangement in which the shortening is always at just the right temperature, resulting in less grease absorption into the foods and wherein such foods as fried chicken, fried pork chops, fried fish, and fried hamburgers are more tasty and more flavorable by virtue of sealing in their natural juices.

Accordingly, it is an object of the present invention to provide a new and improved electric cooking vessel.

It is another object of the present invention to provide an improved electric frying pan having automatically controlled heat.

It is still another object of the present invention to provide an improved electric frying pan of rectangular design.

A still further object of the present invention resides in an improved cooking vessel having the advantages enumerated above and overcoming the disadvantageous features of prior art cooking means.

It is another object of the present invention to provide a new and improved electric frying pan with automatic temperature control means, including means in the handle of such a frying pan for selectively controlling the temperature in response to the required temperature for a particular cooking operation also indicated on the handle.

It is another object of the present invention to provide a new and improved electric frying pan including a cover which will permit viewing the cooking operation.

Still another object of the present invention resides in an improved electric cooking vessel with automatic control means completely sealed so that the entire vessel and at least a portion of the handle may be completely immersed in a suitable liquid for cleaning purposes.

It is another object of the present invention to provide thermostatic control means for accurate control of the temperature of an electric frying pan, which control means is disposed in the base of the frying pan to insure complete and accurate control.

Still another object of the present invention resides in an improved electric cooking vessel with means for insulating the same from the surface upon which it is supported as well as from a handle for manipulating the same.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is an exploded perspective view of an electric frying pan or cooking vessel embodying the present invention;

Fig. 2 is a view partially in section taken along a line such as 2—2 of Fig. 1 of the drawings;

Fig. 3 is an enlarged sectional view taken on line 3—3 of Fig. 2, assuming that Fig. 2 shows the complete construction;

Fig. 4 is a greatly enlarged sectional view taken on line 4—4 of Fig. 3, again assuming that Fig. 3 shows the complete structure;

Fig. 5 is a greatly enlarged view of a portion of Fig. 3 but showing some parts in section that are not shown in section in Fig. 3;

Fig. 6 is a sectional view taken on line 6—6 of Fig. 5, assuming that Fig. 5 shows the complete structure;

Fig. 7 is a sectional view taken on line 7—7 of Fig. 6, assuming that Fig. 6 shows the complete structure;

Fig. 8 is a sectional view taken on line 8—8 of Fig. 5, assuming again that Fig. 5 shows the complete structure;

Fig. 9 is a sectional view taken on line 9—9 of Fig. 6, again assuming that Fig. 6 shows the complete structure;

Fig. 10 is a somewhat schematic circuit diagram showing the electrical heating and control circuit of the cooking vessel of the present invention;

Fig. 11 is a bottom view of the cooking vessel of Fig. 1 with a portion of the handle broken away;

Fig. 12 is an enlarged somewhat top perspective view of the handle of the cooking vessel shown in Fig. 1;

Fig. 13 is a sectional somewhat schematic view similar to Fig. 3 showing a modification of the present invention; and Fig. 14 is a sectional view of the tubular portion only taken on line 14—14 of Fig. 13.

Briefly, the present invention discloses an electric cooking vessel, and specifically, a frying pan comprising a container or vessel of rectangular configuration having rounded corners formed of cast metal, preferably aluminum, with an electric heating element cast integrally therewith on the underside of the cooking surface of the frying pan. A pocket or control chamber is defined within this casting for housing a temperature responsive control means, and in the preferred embodiment also housing a switch controlled thereby. A handle is secured to the frying pan, which handle includes a control chamber for containing manually operable means for selectively setting the temperature at which the temperature responsive means mentioned above operates. Suitable means are provided for connecting the handle to the pan and also providing a passageway for interconnecting the chamber in the handle with the pocket or chamber integrally cast with the frying pan proper. The invention also contemplates a completely waterproof unit whereby the entire frying pan and handle may be immersed in water for cleaning purposes.

Referring now to the drawings, there is illustrated in Figs. 1 and 2 an electric frying pan generally designated by the reference numeral 15. This frying pan is illustrated as comprising a shallow open top vessel or container 16 illustrated as of substantially rectangular configuration thereby permitting one to cook more food in the same area as contrasted with the circular frying pans heretofore commonly employed. As illustrated in Figs. 1 and 11 of the drawings, the vessel or container 16 is substantially square in configuration except that the four corners are smoothly rounded to make cleaning a simple problem. Preferably, the vessel 16 is cast from aluminum which is a metal providing a very good heat conductor and, hence, insuring uniform temperature throughout the area thereof. For the purpose of providing heating means in intimate heat exchange relationship with the bottom 17 of the vessel 16, there is provided an electric heating element 18 which is preferably cast within a C-shaped rib 19 on the underside of the bottom 17. The upper side of the bottom 17, as shown in Figs. 1 and 2 of the drawings, defines the cooking surface, as will be readily understood by those skilled in the art.

The heating element 18 is preferably one of the well known sheathed type heating units which conventionally comprises an outer metal sheath within which is disposed a suitable length of resistance wire such, for example, as the resistance wire sold under the trade-mark "Nichrome," coiled in the form of a helix. As illustrated in Fig. 2 of the drawings, a sheath 20 has a coiled resistance wire 21 disposed therein. Surrounding the coiled resistance wire 21 within the sheath 20 is a refractory composition designated by the reference numeral 23 and commonly formed of fused magnesium oxide which centers the resistance element and which, furthermore, is a good conductor of heat and yet an excellent electrical insulator. As illustrated in Fig. 1, the sheathed heating element 18 is bent into the form of a substantially one turn ring, sometimes referred to as a C-shaped heating element having a diameter somewhat smaller than the exterior dimensions of the vessel 16. By having the heating element 18 cast within the raised rib 19 depending downwardly from the bottom 17, one does not interfere with the flat cooking surface on the upper side of the bottom 17 and at the same time there is insured intimate heat exchange relationship between the sheathed heating element 18 and the cooking surface on the bottom 17.

For the purpose of defining the housing for the terminals of the sheathed heating element 18 and also to define a suitable control chamber, there is provided a chamber 25 defined in part by elliptical-shaped walls 26, preferably cast integrally with the vessel 16 and the rib 19. As best shown in Figs. 3 and 4 of the drawings, the ends of the C-shaped sheathed heating element 18 terminate within the chamber 25. As illustrated, the ends of the sheathed heating element are preferably bent downwardly within the chamber 25 considering the frying pan disposed in its normal position. The ends of the resistance 21 are connected to suitable rigid terminals 27 and 28, respectively. It will be appreciated that the fused magnesium oxide or other suitable insulator, which is already present in the sheathed heating element 18, provides the insulation for insulating the rigid terminals 27 and 28 from other apparatus contained within the chamber or pocket 25.

It will be appreciated that the bottom of the frying pan will reach relatively high temperatures well over 400° F. for certain cooking operations and means must be provided to support the vessel 16 from any suitable surface. With ordinary frying pans which are placed over an electric or gas plate it is desirable to have the bottom of the pan as close ot the source of heat as possible and hence no supporting means other than the bottom of the pan are provided. With the present invention, however, the frying pan may be supported on any surface, including a table or counter, and hence it is desirable to make sure that the surface upon which it is supported will not be injured by the high temperatures to which the bottom of the pan may be subjected. Accordingly, there are provided a plurality of feet generally designated by the reference numeral 30 in Figs. 1 and 2 of the drawings. These feet 30 comprise a somewhat conically shaped insulating member 31 which is secured as by suitable fastening means 32 to the bottom 17 of the vessel 16. To reduce the heat transfer between the vessel 16 and the insulating portion 31 there is preferably interposed between each foot and the bottom a cup-shaped member 33 preferably formed of a relatively poor conductor of heat such as stainless steel or the like. As illustrated, a foot is provided at each corner of the pan and preferably a circular ring or shoulder 34 integral with the bottom 17 is provided at each corner to center or position the thin cup-shaped members 33 preferably formed of stainless steel. The bottom also includes an integral projection 35 concentric with the ring 34 which has a tapped opening to receive the fastening means 32. With this arrangement the cooking vessel 16 is provided with a plurality of feet to support the same above any surface in an insulated manner with a minimum of heat being transferred through the cup-shaped members 33. Since the frying pan of the present invention can be completely immersed in water for cleaning purposes, there is the problem of preventing water from entering the cup-shaped members 33 where it might accumulate. Accordingly, the cup-shaped members 33 have been provided with a plurality of slits 36 which reduce the cross-sectional area through which heat may be transferred and which furthermore provide openings through which any water which might accumulate therein could immediately pass.

In order to secure a suitable handle to the vessel 16 there is included on the vessel 16 an integral boss 40 which is cast during the casting operation and is disposed adjacent one of the walls defining the chamber 25. This boss is provided with a pair of reamed openings 41 which connect with the chamber 25.

For various cooking operations it is desirable to have a suitable cover for a frying pan or cooking vessel to permit final cooking in a closed chamber and to this end there is provided a suitable cover 42 of such a configuration as to define a closure for the vessel or container 16. This cover 42 may be formed of aluminum with an appropriate knob 43 formed of insulating material, such as a phenolic resin or the like, but preferably the cover 42 is formed of a heat resistant glass which permits viewing the contents during a cooking operation. It will be apparent that for certain stewing, braising, and casserole dishes, and for keeping foods warm, a cover is desirable.

To permit the housewife or the user of the electric frying pan of the present invention to handle the same, there is provided in accordance with the present invention a suitable handle 45, preferably molded from a suitable insulating material, such as a phenolic compound of some sort. As best shown in Figs. 3 and 5 of the drawings, the handle 45 is provided at the end remote from the frying pan with a suitable plug recess 46. This plug recess opens toward the free end of the handle to receive a conventional power cord in a manner well understood in the art. Also defined in the handle is a suitable control chamber 47, which control chamber 47 is a somewhat rectangular chamber provided with a suitable ledge 48 around the periphery thereof near the open end for supporting a cover to be described in greater detail hereinafter. This ledge is best shown in Figs. 6, 7, 8, and 9 of the drawings.

The plug recess 46 and the control chamber 47 are separated from each other by a narrow insulating wall portion 49 which, of course, is integrally molded with the handle. This wall portion 49 provides a suitable support for the terminal pins 50 and 51 which extend into the plug recess 46 for engagement with a suitable female receptacle Disposed on either side of the wall 49 are suitable insulating pressure plates 52 and 53 which may be formed of fiber glass or the like and which have suitable openings coaxial with similar openings in partition 49 through which the terminal studs 50 and 51, respectively, extend. These terminal studs 50 and 51 are each provided with an integral shoulder portion, designated as 54 in the drawings, which integral shoulder portions engage with the pressure plate 52. The other end of the terminal studs 50 and 51 extend into chamber 47 and are threaded to receive suitable nuts 55.

To facilitate making electrical connections and to insure that the nuts 55 will not come loose, suitable clinch nuts 56 and 57 are associated with the terminal studs 50 and 51, respectively. Each of these clinch nuts is provided with laterally extending prongs 56a and 57a, respectively, best shown in Figs. 3, 6, and 9 of the drawings, for engaging with suitable notches 53a defined in the pressure plate 53 to prevent rotation of the clinch nuts 56 and 57. The clinch nut 56 is also provided with a projection 56b extending into the control chamber 47 by means of which electrical connection with the terminal stud 50 can readily be made. A suitable light bracket 60, best shown in Figs. 5 and 9, is clamped by the clinch nut 56, the purpose of which light bracket will become apparent as the following description proceeds.

In view of the detailed description included above the assembly of the terminal studs 50 and 51 with the handle 45 will readily be appreciated. The pressure plate 52 will be inserted within the plug recess 46 and the terminal studs 50 and 51 will be inserted into the aligned openings defined in the wall portion 49 and in the pressure plate 52. The threaded ends of the terminal studs 50 and 51 will then extend into the control chamber 47 and the pressure plate 53 can be moved into position with the notches 53a defined therein extending upwardly. The clinch nuts 56 and 57 are then applied respectively to the terminal studs 50 and 51 and the nuts 55 secured into position. The clinch portions of the clinch nuts 56 and 57 are then bent to clampingly engage the edge of the nuts and hence prevent them from coming loose. During this operation the lamp bracket 60 is clamped by the clinch nut 56.

For the purpose of securing the handle 45 to the vessel 16 in a manner to insure that the handle 45 remains cool and can be grasped at any time by the operator, there are provided a pair of supports 62 and 63 in the form of tubular members, preferably formed of stainless steel or similar material which is a poor conductor of heat and at the same time has a pleasing noncorrodible finish. These tubular members 62 and 63 are preferably molded into the handle 45 in the manner shown in Fig. 3 of the drawings, with a portion thereof extending beyond the end of the handle. To insure firm and integral relationship between the tubes 62 and 63 and the handle 45, these tubes are preferably each provided with a knurled section 62a and 63a (Fig. 3 of the drawings), respectively, thus insuring firm bonding between the tubes 62 and 63 and the handle 45. These tubes 62 and 63 are disposed in spaced parallel relationship in the handle in such a manner as to correspond with the spacing between the openings 41 in the lug 40. To secure the handle 45 to the vessel 16, the openings 41 are reamed so as to define a press fit with the tubular portions 62 and 63 which are then pushed into place. A substantial length of the tubes 62 and 63 is inserted with a long tight fit thereby providing a moisture-tight seal between the openings 41 and the tubes 62 and 63.

Two tubes 62 and 63 are provided rather than a single larger tubular member, since the two-tube arrangement eliminates the problem of relative rotation between the handle 45 and the vessel 16. However, a single tube of noncircular configuration could be employed and is illustrated in Fig. 13 as a modification of the present invention.

Stainless steel has an entirely different coefficient of expansion than aluminum, and a substantial problem in providing a moisture-tight seal under both hot and cold conditions is presented. In accordance with the present invention, the tubes 62 and 63 are preferably formed of stainless steel tubing having a rather thin wall. The tubes are forced into the openings 41 with a sufficient press fit which compresses the tubes but does not expand the openings 41 due to the heavy wall thickness of the aluminum. The tubes are, therefore, under considerable compressive stress but within the elastic limit of the stainless steel. Upon heating, the aluminum expands slightly more than the stainless steel tubes 62 and 63. However, due to the resilience of the tubes 62 and 63 and the compressive stress applied thereto, the tubes expand by virtue of the compressive stress to follow the expansion of the aluminum thereby maintaining a tight fit under all temperature conditions encountered in use.

A moisture-tight seal is obviously also provided between the tubes 62 and 63 and the handle 45 which is molded thereto, so as to provide effectively an integral member. It will be apparent, therefore, that by virtue of the tubular members 62 and 63 the control chamber 47 is connected by two passageways, one in each of the tubes 62 and 63, with the control chamber 25. Moreover, by virtue of the fact that the tubes 62 and 63 are made of stainless steel, the portion thereof exposed between the handle 45 and the lug 40 will not corrode and will, furthermore, provide a path of poor heat conductivity between the handle and the vessel, resulting in a substantial temperature drop so that the handle 45 will always remain cool.

For the purpose of maintaining the temperature of the cooking surface of the vessel 16 at some constant selected temperature, it is essential that there be provided suitable temperature responsive means. Such temperature responsive means must be responsive directly to the temperature of the bottom 17 of the pan or vessel 16, and to this end there is provided within the chamber 25 a suitable temperature responsive device in the form of a bimetallic element 66, best shown in Figs. 3 and 4 of the drawings, which bimetallic element is supported at one end by a suitable L-shaped bracket 67, which L-shaped bracket is preferably secured by suitable screws, such as 68, to a suitable lug, such as 69, defined within the control chamber 25. The lug 69 is preferably cast integrally with the vessel 16. As illustrated, the bimetallic element 66 is preferably riveted, as indicated at 70, to the L-shaped bracket 67. The free end of the bimetallic element 66 is provided with a suitable insulating operating portion 71 for engaging and actuating a switch means to be described hereinafter. It will be apparent that the bimetallic element supported in intimate heat exchange relationship with the lug 69, and hence with the vessel 16, will respond very accurately to the temperature of the vessel 16, and particularly the cooking surface thereof.

To maintain a uniform temperature, the heating circuit is interrupted when the temperature attains a predetermined high value, and the heating circuit is reenergized whenever the temperature falls below said predetermined value. To accomplish this there is provided within the switch chamber or control chamber 25 a suitable switch or switch means 73 comprising a pair of relatively movable contacts 74 and 75. The contact 74 might be considered a stationary contact and, as will be described hereinafter, is stationary for any selected setting of the control means, and the contact 75 might be considered the movable contact controlled by the bimetallic element 66. As illustrated, there is provided a leaf spring 77 of somewhat Z-shaped configuration. The Z-shaped leaf member 77 has one arm of the Z suitably welded or otherwise secured to the terminal 27 of the sheathed heating element 18. At an intermediate point of the leaf spring 77 there is supported the movable contact 75. In order that the bimetallic element 66 may manipulate the leaf spring 77, the latter is provided with a lateral extension 77a completing the Z, which extends into the path of movement of the operating member 71. Thus, deflection of the bimetallic element 66 will cause movement of the contact 75 relative to the contact 74.

In order to complete the electric circuit between the terminal 28, which is the other terminal of the sheathed heating element, and the terminal 50, there is provided a suitable conductor 79 illustrated as an insulated conductor having one end soldered or otherwise electrically connected with extension 56b of the clinch nut 56 while the other end is welded or soldered to the terminal 28, as indicated at 80. The conductor 79 extends through the tubular member 62.

For the purpose of providing an indication in the control chamber 47 of the condition of the switch 73 (whether the switch is open or closed), there is provided a suitable signal light 82, indicated specifically in Figs. 8 and 9 of the drawings as a neon lamp 82, supported by the bracket 60 in a position slightly above the ledge 48. This lamp 82 is electrically connected across the terminals of the resistance heating element 21 in series with a suitable current limiting resistor 83, shown in Fig. 10 of the drawings. To complete this electrical circuit schematically shown in Fig. 10 of the drawings, a suitable conductor 84, including the resistance 83, connects one terminal of the lamp 82 with the terminal 27, to which the switch contact 75 is also connected by leaf spring 77. The other terminal of the lamp is connected by a conductor 85 with the extension 56b of the clinch nut 56. Thus, it is readily apparent that whenever current flows through the resistor 21 of the sheathed heating element 18, the lamp 82 will be energized, and if no current flows through the resistor 21, which occurs when the switch 73 is open, no potential will be applied to the lamp 82.

To complete the electrical circuit between the so-called stationary contact 74 and the terminal stud 51, and at the same time to provide for selective control of the temperature at which the switch 73 is operated, there is provided in accordance with the present invention a movable conductor or contact rod 87, on one end of which is supported the so-called "stationary contact" 74. This movable contact rod 87 is disposed concentrically of the tube 63 and is arranged for limited movement along the longitudinal axis thereof. To support the rod contact 87 in insulated and readily movable relationship with the tube 63, there is provided an insulating sleeve 88 concentrically disposed within the tube 63 and suitably supported by insulated closure plugs 89 and 90 at either end of tube 63. These closure plugs 89 and 90 are provided with suitable central openings to accommodate the contact rod 87. The contact or control rod 87, in accordance with the present invention, extends between control chambers 25 and 47, and is provided within control chamber 47 with a flattened section 87a provided along one edge with a rack portion 90. A suitable compression type backlash spring 91 is disposed concentrically with the rod contact 87 within control chamber 47 and has one end of reduced diameter engaging with a suitable shoulder 92 (Fig. 5) defined at the junction between the main portion of rod contact 87 and the flattened section 87a thereof, while the other end of the spring 91 engages with the insulated closure plug 89. This spring normally tends to bias the rod contact 87 and specifically the contact members 74 away from the contact 75. In other words, it tends to bias the switch 73 to the open position.

For the purpose of completing the electrical circuit between rod contact 87 and the terminal stud 51, there is included a flexible conductor 93, preferably in the form of a thin ribbon of silver which has one end secured as by a rivet 94 with the end of the rack portion 87a of the rod contact 87, and the other end secured to the terminal stud 51 and clamped thereto by the nut 55 and clinch nut 57, as is clearly shown in Fig. 5 of the drawings. Thus, there has been described the complete electrical circuit shown in Fig. 10 of the drawings which permits selective positioning of the stationary contact 74 of the switch 73 depending upon the position of rod contact 87 and automatic temperature control by virtue of operation of the bimetallic element 66.

In order to insure proper insulation of the conductors 79 and 84 within the control chamber 25, they preferably are included within a fiber glass sleeve or the like (not shown) and clamped into position by means of a suitable wire clamp 95 (Fig. 4) secured to the lug 69 by suitable fastening means 96.

To maintain the switch or control chamber 25 in sealed relationship to permit immersion of the vessel 16 in water for cleaning purposes, the elliptical wall portion 26 of the control chamber 25 is adapted to be engaged by a suitable cover 98 having a recess 99 defined therearound to receive a suitable sealing gasket 100 which is preferably formed of silicone, rubber or the like. This cover 98 is secured to the vessel 16 by suitable fastening means 101. Preferably, suitable sealing washers 102 insure that no liquid can enter the openings in cover 98 provided for the fastening means 101. The fastening means 101, moreover, threadedly engage with suitable tapped openings defined in the lug 69 and a corresponding lug 103 integrally formed with the cast vessel 16. Thus, there is provided an arrangement in which the control chamber 25, which contains the temperature responsive element and suitable switch means, is completely sealed against the entrance of moisture and the like, permitting complete immersion of the vessel 16, and, in fact, as will become apparent from the following description, immersion of the handle 45 as well.

It will be understood that although the switch 73 has been indicated as disposed within the control chamber 25, it might also be disposed within the control chamber 47, as indicated in Fig. 13 of the drawings. It is, however, essential that the bimetallic element 66 be disposed within the control chamber 25, or at least closely adjacent to the cooking surface whose temperature it is desired to maintain at a selected predetermined value. If the switch 73 is positioned within the chamber 47, it is necessary to provide a mechanical or operating connection between the bimetallic element 66 within the chamber 25 and the switch means disposed within the chamber 47. This can readily be accomplished, as shown in Fig. 13 of the drawings, although the arrangement of Fig. 3 is at present believed to be the preferred embodiment of the present invention. It is intended, however, in the appended claims to cover both arrangements embodying the features of the present invention.

From an examination of Figs. 1, 3, 5 and 12, it will be apparent that the handle 45 has a relatively wide surface on the upper portion thereof, part of which surface is taken up by the chamber 47. However, the substantial surface area between the end of the handle adjacent the vessel 16 and the chamber 47 designated by the reference numeral 105 provides a very desirable surface to contain cooking information as to the desired setting of the control means. Preferably, therefore, there is applied to this surface, as shown in Figs. 1 and 12 of the drawings, suitable indicia with respect to certain foods that are to be cooked in the frying pan or vessel 16, and the temperatures at which these foods should be cooked, or, in other words, the setting of the control means to be described hereinafter.

In order to define a closure for the chamber 47, there is preferably provided a suitable cover or escutcheon 106, preferably formed of a molded material such as polystyrene, which is adapted to rest on the ledge or shoulder 48 described above adjacent the upper end of the chamber 47. This cover plate or escutcheon 106 preferably includes a recess 107, best shown in Figs. 1, 6, 8 and 9, to receive therein the lamp 82. This recess brings the lamp relatively close to the surface of the cover so that it can readily be observed. Moreover, the polystyrene material is somewhat translucent and when the lamp 82 is lit the entire escutcheon is somewhat illuminated. The escutcheon is preferably secured in position by suitable fastening means 108 threaded into bosses 109 integrally molded with the handle 45 and disposed within the chamber 47.

For the purpose of manipulating suitable control means, and specifically the rod contact 87, there is provided a suitable manually actuable knob 110 adapted for disposition within a suitable recess 111 defined in the escutcheon or cover plate 106. This knob 110 is preferably connected to a suitable shaft 112 having a pinion 113 defined thereon. As illustrated, the shaft 112 is rotatably mounted within the escutcheon plate 106. A suitable nylon bushing 114 having an enlarged knurled portion 114a is mounted for rotation within an enlarged bearing or opening 115 within the escutcheon 106 connecting with the recess 111. A suitable knob sealing washer 116, preferably formed of a rubber compound which will permit relative movement between parts and still maintain a seal, is provided. The knurled portion 114a is adapted to be received within a cooperating opening 110a having a knurled surface in knob 110 and secured thereto by means of a suitable fastening means 118. To secure the assembly comprising bushing 114, shaft 112 and pinion 113 in operating position there is provided a suitable flat washer 119, a spring washer 120, and a securing member 121. The washer 119 engages a suitable shoulder defined on the side of the cover plate or escutcheon 106 opposite the knob 110. The stored energy in spring washer 120 maintains pressure on the parts and in sealing engagement with sealing washer 116.

For the purpose of converting rotatable movement of the knob 110, and consequently of the pinion 113, to longitudinal movement of the rod contact 87, there is provided a reduction gear mechanism in the form of a segmental gear 122 and an associated pinion gear 123 suitably secured to a pinion shaft 124 supported for pivotal movement in a bearing 125 defined within chamber 47. The segmental gear 122 and the pinion 123 are rigidly secured to the pinion shaft 124. The pinion 123 is, moreover, engaged with the rack portion 90 of the rod contact 87 so that rotation of the knob 110 will cause reciprocal movement of the rod contact 87. By virtue of the gear reduction provided by the segmental gear 122 and the pinion gear 123, a substantial movement of the knob 110 is provided while causing only relatively limited movement of rod contact 87. This permits one to have a relatively long dial scale associated with the knob 110 for fairly limited movement of rod contact 87. It will be understood that suitable temperature indicia will be provided on the escutcheon 106 surrounding the knob 110 to show the appropriate temperature settings and also to indicate an off position. This indicia is indicated in Fig. 1 of the drawings by reference numeral 127. A suitable escutcheon gasket 128 is disposed between the escutcheon 106 and the shoulder 48, which gasket is formed of Buna N rubber or similar material. It will be apparent that the anti-backlash spring described above will maintain the gear teeth in proper engagement and insure the desired selective movement of the rod contact and the desired selective setting of the switch control means in response to the corresponding setting of the knob 110.

As was mentioned above, the two tubes 62 and 63 could be replaced by a single tube, and the switch 73 instead of being disposed within chamber 25 might be disposed within chamber 47. In Figs. 13 and 14 of the drawings there is illustrated another embodiment of the present invention incorporating these two modifications, the disclosure of Fig. 13 is somewhat schematic in some respects in order to simplify the disclosure. The corresponding parts of Fig. 13 are designated by the same reference numerals as in the preceding embodiment. As there illustrated, a handle 45', very similar to the handle 45, is provided with the identical plug recess 46, including the identical terminal pins 50 and 51. The integral boss designated as 40' is substantially identical with the boss 40 of the preceding embodiment, except that instead of having two openings 41 therein for receiving the tubes 62 and 63, it has a single opening 129 of somewhat elliptical shape to receive as by a press fit a tubular member 130 whose cross-sectional configuration is best shown in Fig. 14 of the drawings. The tubular member 130 is preferably formed of stainless steel or other noncorrodible material which is a relatively poor conductor of heat, and it is connected by a press fit with the boss 40' in the same manner as was described in connection with the tubes 62 and 63 to insure a completely moistureproof seal. By virtue of the elliptical construction, there is no possibility of the vessel 16 rotating relative to the tubular member 130 about the longitudinal axis thereof, and hence no strain on the seal will occur. It should be understood, however, that, if desired, the tube 130 may have a circular cross section.

As in the preceding embodiment, the stainless steel tubular member 130 is provided with a knurled portion 131 to insure firm bonding when molded into the handle 45′. Also,, as in the preceding embodiment, a chamber 47 is defined in the handle 45. Within the chamber 47 there is provided a suitable switch 132, comprising relatively movable contacts 133 and 134. The contact 133, which may be designated as the movable contact, is mounted on a leaf spring 135, while the contact 134, which may be considered the stationary contact, is mounted on a leaf spring 136.

For the purpose of opening and closing the switch 132 in response to the temperature of the frying pan or cooking vessel 16, there is provided in chamber 25 the thermo-responsive device or bimetal 66′, which may be identical with the bimetal 66 previously described, except that it deflects in the opposite direction with heating and cooling. In other words, the high expansion side thereof is on the opposite side from that shown in Fig. 3 of the drawings. For operating the switch there is provided an insulating rod 138, which corresponds to the member 71 in Fig. 3 of the drawings, but which is elongated and extends through the passageway 139 in tubular member 130 for engaging the leaf spring 135 to cause movement of the contact 133 in response to temperature changes. If desired, a suitable guide 140 may be provided to guide the movement of the insulating rod 138.

The electrical circuit in the arrangement shown in Fig. 13 of the drawings is very simple, comprising an electrical conductor 141, which is shown as an insulated conductor directly connecting terminal 27 of the sheathed heating element 18 with terminal pin 50. Similarly, the terminal 28 of the sheathed heating element 18 is connected by means of an insulated conductor 142 with the leaf member 135, and an insulated conductor 143 connects leaf member 136 with terminal pin 51. The insulated conductors 141 and 142 extend through the passageway 139 within tubular member 130. The same indicating light 82, schematically shown in Fig. 13, and the current limiting resistor 83 are provided as in the preceding embodiment. These are indicated as being connected across the terminals 27 and 28, and, specifically, as across the ends of conductors 141 and 142 remote from terminals 27 and 28.

For the purpose of adjustably setting the temperature at which switch 132 is operated, there is provided a rack mechanism 145 engageable with the pinion 123 described above. The rack 145 is provided with an insulating extension 146 engageable with the leaf 136. The pinion 123 is preferably operated in the same manner as in the preceding embodiment. It will be apparent that any other suitable mechanism for adjusting the position of the leaf 136 in response to adjustment of the control knob 110 may be employed.

In view of the detailed description included above, the operation of the electric cooking vessel of the present invention will be understood by those skilled in the art. It will, moreover, be appreciated that there has been provided a completely automatic cooking vessel with temperature responsive means disposed in a sealed chamber associated with the vessel and control means disposed in a control chamber in the handle, which two chambers are interconnected by one or more suitable passageways. In one embodiment a very simple construction is provided by having one contact of the switch forming a part of a movable control rod. The parts of the device are completely waterproof, so that the entire device, except perhaps the end of the handle, may be completely immersed in hot sudsy water for cleaning purposes. Moreover, the housewife or whoever uses the frying pan will have controlled heat at her fingertips with the desired heating temperature indicated in the setting means immediately adjacent thereto. The user of the frying pan has merely to look at the cook guide on the handle to select the proper temperature for a particular cooking operation and then set the control knob to this temperature, whereupon this temperature will be assured over the entire cooking surface with highly satisfactory results during the cooking operation. Moreover, the shape of the vessel is such that the maximum cooking area is available and yet the cleaning problem remains very simple. The frying pan, by virtue of the stainless steel members interposed between the handle and the vessel and included in the feet, may also be supported from any surface and can readily be handled at all times with the handle remaining cool.

While there have been illustrated and described several embodiments of the present invention, various changes and modifications will occur to those skilled in the art, and it is intended in the appended claims to cover all such changes and modifications as fall within the true spirit and scope of the present invention.

What is claimed as new and desired to be secured by Letters Patent of the United States is:

1. An electric frying pan comprising a cast aluminum shallow open top vessel of generally rectangular configuration having rounded corners, a heating element cast into the bottom of said vessel, an insulating handle for said vessel, means comprising a pair of tubular metal members formed of relatively poor heat conducting material for connecting said handle to said vessel with said handle extending from said vessel in a generally lateral direction, said tubular metal members spacing said insulating handle from said vessel and being the sole means for supporting said vessel from said handle, a switch chamber defined at the bottom of said vessel by walls cast integrally with said vessel, a control chamber defined in said handle, a passageway within at least one of said tubular members interconnecting said chambers, a switch in said switch chamber, control means in said control chamber, and means extending through said passageway for mechanically interconnecting said switch and said control means.

2. A cooking unit comprising a shallow open top vessel, a heating element integrally united with the bottom of said vessel, an insulating handle for said vessel, means comprising a pair of tubular metal members arranged in spaced parallel relationship for connecting said handle to said vessel with said handle extending from said vessel in a generally lateral direction, said tubular members being formed of a noncorrodible poor heat conductor effectively to insulate said handle from said vessel, a switch chamber defined at least in part by the bottom of said vessel, a switch in said switch chamber, a control chamber defined in said handle, control means in said control chamber, said tubular members defining a pair of passageways between said switch chamber and said control chamber, a movable control element extending within one of said tubular members for mechanically relating said control means and said switch, and means for moisture sealing said switch chamber and the joints between said tubular members and said vessel and handle to permit immersion of all of said vessel and at least part of said handle in liquid for cleaning purposes.

3. In combination, an electrically heated cooking vessel having a plurality of supporting feet fastened to the bottom thereof, each foot comprising a non-metallic heat insulating element, a thin metallic cup-shaped element and a fastening element to secure all elements of each foot to said cooking vessel with the cup-shaped element interposed between the vessel and the insulating element and with the open portion of the cup-shaped element in engagement with the bottom of said vessel, said closed end of said cup-shaped element being provided with an opening sufficiently large for loosely receiving said fastening element.

4. In combination, an electrically heated cooking vessel having a plurality of supporting feet fastened to the bottom thereof, each foot comprising three parts, a support engaging non-metallic heat insulation element, a thin metallic cup-shaped element having a plurality of openings defined therein, and a fastening element to secure the elements of each foot to the cooking vessel with the cup-shaped element interposed between the vessel and the insulating element and so fastened that the open portion of the cup-shaped element is in contact with the bottom of the vessel.

5. A cooking vessel comprising a one-piece casting, a heating element integrally united with the bottom of said casting, said bottom and associated heating element being unshielded whereby heat radiated therefrom will strike directly any supporting surface on which the vessel is placed, a plurality of supporting legs for supporting said vessel a sufficient distance from the supporting surface to prevent said unshielded bottom from adversely affecting said supporting surface, said legs each including a lower portion of insulating material, an upper portion of sheet metal and a fastening means, the upper portion being a cup-shaped member constructed to conduct a minimum quantity of heat from said vessel to said lower portion whereby said lower portion will not be adversely affected by heat conducted through said upper portion, said cup-shaped element including a plurality of openings therein, the open end of said cup-shaped member engaging said vessel, and means including said fastening means for securing each of said legs directly to said one-piece casting, said last mentioned means simultaneously holding said lower and upper portions of the associated leg in assembled relationship with the bottom of said vessel.

6. The cooking vessel of claim 5 wherein the bottom of said vessel is provided with a plurality of integral downwardly extending circular rings one for each of said legs to receive therein the open end of the cup-shaped member of the associated leg.

7. The cooking vessel of claim 6 wherein the underside of said cooking surface is provided with a plurality of integral projections, each projection concentric with a different one of said circular rings, and each projection including a threaded opening for its associated fastening means.

8. A cooking vessel immersible in liquid for cleaning purposes and including a cooking surface having an electrical heating element in intimate heat exchange relationship with the underside thereof, said vessel including integrally formed wall portions at the bottom portion thereof defining a recess having an access opening thereto, at least a portion of said recess extending below the underside of said cooking surface, said recess forming a substantial part of a sealed chamber, a handle for said vessel comprising two portions, one portion being non-metallic with a longitudinally extending passageway therein and the other portion being a tubular spacer member interposed between said vessel and said non-metallic handle portion to space said non-metallic handle portion from said vessel, means for securing said handle to the means defining said sealed chamber with the passageway in said one handle portion in communication with said recess through said tubular member and for sealing said recess against the entrance of moisture or other foreign matter thereby to provide said sealed chamber including said recess, an adjustable temperature responsive device having the temperature responsive portion thereof mounted in said recess with a control portion thereof extending through said spacer portion of said handle into said non-metallic portion, and adjusting means mounted on said non-metallic handle portion interconnected with said control portion to vary the settings of said adjustable temperature responsive device.

9. A cooking vessel immersible in liquid for cleaning purposes and including an electrical heating element in intimate heat exchange relationship therewith, said vessel at the bottom portion thereof including a plurality of integrally formed walls defining an enclosure having an access opening thereto, sealed closure means for closing said access opening, said walls and closure means effectively defining a sealed thermostat chamber, a hollow handle for said vessel comprising two portions, one portion being non-metallic and the other portion being a tubular spacer member interposed between said means defining said thermostat chamber and said non-metallic handle portion, means for securing said handle to the means defining said thermostat chamber, an adjustable temperature responsive device having the temperature responsive portion thereof mounted in said thermostat chamber with a control portion thereof extending through said spacer portion of said handle into said non-metallic portion, and adjusting means mounted in said non-metallic handle portion mechanically interconnected with said control portion to vary the settings of said adjustable temperature responsive device.

10. A cast aluminum electrically heated thermostatically controlled cooking vessel immersible in liquid for cleaning purposes and including a flat bottom wall having a cooking surface on the upper side thereof, wall portions cast integrally with the bottom portion of said vessel defining a recess, at least part of said recess extending below the bottom of said vessel, a length of sheathed electric heating element shaped to form a loop with the ends thereof extending into said recess, said heating element being embedded in an integral cast projection on the underside of said bottom wall and extending below the bottom of said vessel in a plane parallel with said underside of said bottom wall, said cast projection merging with said recess defining wall portions, an insulating handle for said vessel having a longitudinally extending passageway therein, means for securing said handle to said vessel with said passageway in said handle in direct communication with said recess, means for completely sealing said recess against the entrance of moisture or other foreign matter to provide a sealed chamber including said recess, an adjustable temperature responsive device having the temperature responsive portion thereof mounted in the portion of said sealed chamber adjacent the bottom of the vessel with a control portion thereof extending into said passageway in said handle, and adjusting means mounted on said handle and interconnected with said control portion in said passageway to vary the settings of said temperature responsive device.

11. A cast aluminum electrically heated thermostatically controlled cooking vessel immersible in liquid for cleaning purposes and including a flat bottom wall having a cooking surface on the upper side thereof, wall portions cast integrally with the bottom portion of said vessel defining a recess, at least part of said recess extending below the bottom of said vessel, a length of sheathed electric heating element shaped to form a loop with the ends thereof extending into said recess, said heating element being embedded in an integral cast projection on the underside of said bottom wall and extending below the bottom of said vessel in a plane parallel with said underside of said bottom wall, said cast projection merging with said recess defining wall portions, a handle for said vessel comprising two portions, one portion being non-metallic with a longitudinally extending passageway therein and the other portion being a tubular spacer member interposed between said vessel and said non-metallic handle portion to space said non-metallic handle portion from said vessel, means for securing said handle to said vessel with the passageway in said one handle portion in communication with said recess through said tubular member and for sealing said recess against the entrance of moisture or other foreign matter to provide a sealed chamber including said recess, an adjustable temperature responsive device having the temperature responsive portion thereof mounted in the portion of said sealed chamber adjacent the bottom of the vessel with a control portion thereof extending through said spacer portion of said handle into said non-metallic portion, and adjusting means mounted on said non-metallic handle portion interconnected with said control portion to vary the settings of said adjustable temperature responsive device.

12. A cast aluminum electrically heated thermostatically controlled cooking vessel immersible in liquid for cleaning purposes and including a flat bottom wall having a cooking surface on the upper side thereof, wall portions cast integrally with the bottom portion of said vessel defining a recess, at least part of said recess extending below the bottom of said vessel, a length of sheathed electric heating element shaped to form a loop with the ends thereof extending into said recess, said heating element being embedded in an integral cast projection on the underside of said bottom wall and extending below the bottom of said vessel in a plane parallel with said underside of said bottom wall, said cast projection merging with said recess defining wall portions, an insulating handle for said vessel having a longitudinally extending passageway therein defining a handle chamber, means for securing said handle to said vessel with said passageway in said handle in direct communication with said recess, means for completely sealing said recess against the entrance of moisture or other foreign matter to provide a sealed chamber including said recess, an adjustable temperature responsive device having the temperature responsive portion thereof mounted in the portion of said sealed chamber adjacent the bottom of the vessel with a control portion thereof extending into said passageway in said handle, adjusting means mounted on said handle and interconnected with said control portion in said passageway to vary the settings of said temperature responsive device, switch means controlled by said thermostat means disposed in one of said chambers, and electric circuit means interconnecting said switch means and the ends of said heating element extending into said recess.

13. The cooking vessel of claim 8 wherein switch means are provided either in said recess or in said passageway connected in circuit with said heating element for controlling the flow of current in said heating element, said switch means being controlled by said temperature responsive device, said adjusting means comprising a control knob connected to control the effective operation of said switch means.

14. The cooking vessel of claim 13 wherein a conductor movable along its longitudinal axis is provided in said passageway and rotaiton of said control knob causes movement of said conductor along its longitudinal axis.

15. The cooking vessel of claim 8 wherein switch means connected in circuit with said heating element and controlled by said temperature responsive device is provided in said sealed chamber.

16. The cooking vessel of claim 8 wherein said vessel and the wall portions defining said recess are formed of aluminum and said tubular spacer member comprises a thin-walled metal tube, and wherein said means for securing said handle portion to said means defining said sealed chamber and for sealing said recess comprises a press fit sealed connection between said tube and the wall portions defining said recess and sealed closure means for said access opening.

17. The cooking vessel of claim 9 wherein said vessel and integrally formed walls defining said enclosure are of aluminum and said tubular spacer member comprises a stainless steel tube, and wherein one of said integrally formed wall portions is provided with integral boss means defining an opening for receiving one end of said stainless steel tube, said tube being disposed in said opening in said boss means with a sufficient press fit not exceeding the elastic limit of said tube but so that even upon greater expansion with heating of said aluminum boss means defining said opening than the expansion of said stainless steel tube with heating a moisture-tight seal under all conditions is assured between said tube and the boss means defining said opening.

18. The cooking vessel of claim 10 wherein said handle has defined therein a chamber portion connected with said sealed chamber through said passageway, switch means in said sealed chamber connected in series with said electric heating element, a movable rod extending within said passageway between said chambers for selectively controlling said switch means in said first chamber, said adjusting means mounted on said handle comprising a control knob operatively connected to said movable rod.

19. The cooking vessel of claim 18 wherein said movable rod is nonrotatable and movable along its longitudinal axis.

20. The cooking vessel of claim 19 wherein the connection between said control knob and said movable rod comprises a rack means associated with said rod drivingly engaging gear means connected to said knob.

21. The cooking vessel of claim 8 wherein switch means comprising a contact are disposed in the portion of said sealed chamber adjacent said recess for controlling said heating element, an elongated non-rotatable conductor disposed within the passageway in said handle and extending into said sealed chamber, means for supporting said contact at one end of said conductor, a rack connected to said conductor within said passageway, said adjusting means comprising a rotatable knob, and means comprising reduction gear mechanism for interconnecting said knob and said rack whereby rotation of said knob causes movement of said conductor along the longitudinal axis of said passageway, said reduction gear mechanism permitting substantial rotative movement of said knob with limited movement of said conductor.

22. The cooking vessel of claim 8 comprising an electric frying pan wherein a moisture-tight seal is provided adjacent each end of said tubular spacer member.

23. The cooking vessel of claim 8 wherein said non-metallic handle portion is formed of molded insulating material and provided with means defining an opening at one side thereof affording access to said passageway therein, a cover for said opening secured to said molded handle portion, said passageway adjacent said opening in the molded portion of said handle being enlarged somewhat to define a control chamber in said molded handle portion, movable means extending between said chambers in said passageway including the means for interconnecting said adjusting means and said temperature responsive device, switch means in the portion of said sealed chamber adjacent said recess, a pair of terminal pins adapted for connection with an external power source supported by the molded portion of said handle and extending into said control chamber, and means electrically interconnecting said pins, said electric heating element and said switch means into an electrical circuit including electric conductors disposed in said passageway, said electrical circuit being effectively sealed against the entrance of moisture into said passageway and chambers whereby said cooking vessel may be immersed in liquid for washing and the like.

24. The cooking vessel of claim 8 wherein said tubular spacer member is formed of metal.

25. The cooking vessel of claim 8 wherein said tubular spacer member is formed of metal and said non-metallic handle portion is formed of molded insulating material, and wherein the end of said metal tubular spacer member adjacent said molded handle portion is molded into said molded handle portion to provide a moisture-tight seal.

26. The cooking vessel of claim 8 wherein a cooking guide chart is provided on said non-metallic handle portion, said cooking guide chart listing a variety of cooking operations to be performed with said cooking vessel together with suggested temperature settings for each such operation, and wherein said adjusting means comprises a manually operable heat control knob member mounted for movement relative to said non-metallic handle portion, an indicia means associated with said knob member for indicating selected positions of said knob member in accordance with any setting on said chart thereby automatically to control the cooking temperature of said vessel in an optimum manner.

27. The cooking vessel of claim 9 wherein said recess is wholly defined below the bottom of said vessel and said access opening is downwardly directed, and said sealed closure means includes a cover and gasket.

28. The cooking vessel of claim 11 wherein said tubular spacer member comprises a metal tube.

References Cited in the file of this patent

UNITED STATES PATENTS

| | | |
|---|---|---|
| 1,121,575 | Abtmeyer | Dec. 15, 1914 |
| 1,257,599 | Hadaway | Feb. 26, 1918 |
| 1,597,241 | Marsden | Aug. 24, 1926 |
| 1,629,737 | Rohne | May 24, 1927 |
| 1,830,058 | Helmond | Nov. 3, 1931 |
| 1,886,112 | Luarde | Nov. 1, 1932 |
| 1,971,577 | Parker | Aug. 28, 1934 |
| 1,992,843 | Serenberg | Feb. 26, 1935 |
| 2,035,147 | Dennis | Mar. 24, 1936 |
| 2,076,096 | Samuels | Apr. 6, 1937 |
| 2,159,869 | Thomas | May 23, 1939 |
| 2,164,813 | Gunther | July 4, 1939 |
| 2,267,387 | Winborne | Dec. 23, 1941 |
| 2,282,089 | Propernick | May 5, 1942 |
| 2,287,571 | Purpura | June 23, 1942 |
| 2,306,979 | Potsdam | Dec. 29, 1942 |
| 2,440,128 | Sullivan | Apr. 20, 1948 |
| 2,454,576 | Slack | Nov. 23, 1948 |
| 2,538,567 | Jones | Jan. 16, 1951 |
| 2,552,253 | Brown | May 8, 1951 |
| 2,571,782 | Swenson | Oct. 16, 1951 |
| 2,657,300 | Sullivan | Oct. 27, 1953 |
| 2,694,766 | Ireland | Nov. 16, 1954 |

FOREIGN PATENTS

| | | |
|---|---|---|
| 244,554 | Switzerland | Mar. 21, 1945 |
| 599,292 | Great Britain | Mar. 19, 1948 |
| 663,214 | Great Britain | Dec. 19, 1951 |
| 664,113 | Great Britain | Jan. 2, 1952 |
| 719,033 | Great Britain | Nov. 24, 1954 |